United States Patent [19]
Kaplan et al.

[11] Patent Number: 5,539,903
[45] Date of Patent: * Jul. 23, 1996

[54] METHOD AND APPARATUS FOR PRODUCING A REPORT FROM A QUERY TO A DATABASE BASED ON A REPORT FORMAT

[75] Inventors: Craig A. Kaplan, Santa Cruz; Stanley E. Taylor, San Jose; Gregory J. Wolff, Mountain View, all of Calif.

[73] Assignee: International Business Machines Corporation, Armonk, N.Y.

[ * ] Notice: The term of this patent shall not extend beyond the expiration date of Pat. No. 5,426,781.

[21] Appl. No.: 398,584

[22] Filed: Mar. 2, 1995

Related U.S. Application Data

[63] Continuation of Ser. No. 876,255, Apr. 30, 1992, Pat. No. 5,426,781.

[51] Int. Cl.⁶ .................................................. G06F 17/30
[52] U.S. Cl. .................... 395/600; 364/DIG. 1; 364/282.1; 364/283.3; 364/283.4
[58] Field of Search ............................................. 395/600

[56] References Cited

U.S. PATENT DOCUMENTS

| | | | |
|---|---|---|---|
| 4,752,889 | 6/1988 | Rappaport et al. | 395/12 |
| 5,261,093 | 11/1993 | Asmuth | 395/600 |
| 5,426,781 | 6/1995 | Kaplan et al. | 395/600 |
| 5,428,737 | 6/1995 | Li et al. | 395/161 |
| 5,428,776 | 6/1995 | Rothfield | 395/600 |

*Primary Examiner*—Thomas G. Black
*Assistant Examiner*—John C. Loomis
*Attorney, Agent, or Firm*—Marilyn Smith Dawkins

[57] ABSTRACT

In a computer database system, a method and system are provided for interactively and iteratively constructing a query using a table metaphor displayed on a user display. Alterations are made directly to the table metaphor by the database user. The alterations relate to adding, deleting, or combining columns of attributes and limiting ranges of attribute values. The alterations are registered and the table metaphor updated to reflect the registered alterations. The table metaphor can be repeatedly used to further register additional alterations. The query corresponding to the table metaphor in its final form is run against the full database to generate a report in the format indicated by the table metaphor.

2 Claims, 5 Drawing Sheets

|  | Database Interface |  |  |  |  |
|---|---|---|---|---|---|
| File  Display  Data |  |  |  |  |  |
|  | 18 | 19 | 22  44 | 20 | 21 |
|  | Name | Id | Salary ± | Com | Dept |
| 25 — sample 4 | Craig | 49 | 20 | 43 | 15 |
| 26 — sample 3 | Barb | 8 | 22 | 34 | 15 |
| 27 — sample 2 | Bennet | 63 | 16 | 55 | 15 |
| 28 — sample 5 | Debbie | 68 | 17 | 19 | 17 |
| 29 — sample 1 | John | 17 | 17 | 17 | 17 |

|  | Database Interface |  |  |  |  |  |
|---|---|---|---|---|---|---|
| File  Display  Data |  |  |  |  |  |  |
|  | 18 | 19 | 22 | 20 | 42 | 21 |
|  | Name | Id | Salary | Com | Salary+Com | Dept |
| 25 — sample 4 | Craig | 49 | 20 | 43 | 63 | 15 |
| 26 — sample 3 | Barb | 8 | 22 | 34 | 56 | 15 |
| 27 — sample 2 | Bennet | 63 | 16 | 55 | 71 | 15 |
| 28 — sample 5 | Debbie | 68 | 17 | 19 | 36 | 17 |
| 29 — sample 1 | John | 17 | 17 | 17 | 34 | 17 |

*FIG. 5*

|  | | Database Interface | | | | |
|---|---|---|---|---|---|---|
|  | Name (18) | Id (19) | Salary (22) | Com (20) | Salary+Com (42) | Dept (21) |
| Select1 |  |  | 20< |  |  |  |
| sample 4 | Craig | 49 | 20 | 43 | 63 | 15 |
| sample 3 | Barb | 8 | 22 | 34 | 56 | 15 |
| sample 2 | Bennet | 63 | 16 | 55 | 71 | 15 |
| sample 5 | Debbie | 68 | 17 | 19 | 36 | 17 |
| sample 1 | John | 17 | 17 | 17 | 34 | 17 |

*FIG. 6*

|  | | Database Interface | | | | |
|---|---|---|---|---|---|---|
| File Display Data |  |  |  |  |  |  |
|  | Name (18) | Id (19) | Salary (22) | Com (20) | Salary+Com (42) | Dept (21) |
| Select2 |  |  |  | 40< |  |  |
| Select1 |  |  | 20< |  |  |  |
| sample 4 | Craig | 49 | 20 | 43 | 63 | 15 |
| sample 3 | Barb | 8 | 22 | 34 | 56 | 15 |
| sample 2 | Bennet | 63 | 16 | 55 | 71 | 15 |
| sample 5 | Debbie | 68 | 17 | 19 | 36 | 17 |
| sample 1 | John | 17 | 17 | 17 | 34 | 17 |

*FIG. 7*

| | Name | Id | Salary | Com | Salary+Com | Dept |
|---|---|---|---|---|---|---|
| Select2 | | | | 40< | 50< | |
| Select1 | | | 20< | | 50< | |
| sample 4 | Craig | 49 | 20 | 43 | 63 | 15 |
| sample 3 | Barb | 8 | 22 | 34 | 56 | 15 |
| sample 2 | Bennet | 63 | 16 | 55 | 71 | 15 |
| sample 5 | Debbie | 68 | 17 | 19 | 36 | 17 |
| sample 1 | John | 17 | 17 | 17 | 34 | 17 |

FIG. 8

METHOD AND APPARATUS FOR PRODUCING A REPORT FROM A QUERY TO A DATABASE BASED ON A REPORT FORMAT

This application is a continuation of U.S. patent application Ser. No. 07/876,255, filed on Apr. 30, 1992, now U.S. Pat. No. 5,426,781, entitled "COMPUTERIZED REPORT—BASED INTERACTIVE DATABASE QUERY INTERFACE" in the name of Craig A. Kaplan, et al.

TECHNICAL FIELD

This invention relates to computerized database systems. More particularly, this invention relates to an interactive interface for graphically formulating a relational database query and simultaneously formulating a report format to display the results of the query.

BACKGROUND OF THE INVENTION

Computer databases that store data electronically are commonly used for retrieving data more efficiently and easily than paper file storage methods. Database systems can be used to produce reports organizing the data for output to the user in clear formats. For example, an employee database can contain data on employees such as their respective names, salaries, departments, managers, and employee IDs. This information can be periodically retrieved and organized into reports, such as a report on all employees having salaries in a given salary range. The report could specify, for those employees having a salary in a given range, their names, employee IDs and departments. Similarly, a report can be produced on every employee in a given department, containing their names and employee ID.

One type of computer software database management system for logically organizing the data stored in the database is a relational database management system (RDBMS). In a RDBMS, the data is logically stored in tables having columns corresponding to attributes of the data (such as employee ID, salary, and department number) and rows corresponding to the records of grouped attributes (such as the attributes for a given employee). Query languages such as the structured query language (SQL) are used to query the database and extract particular portions of the data, such as a list of particular attributes of employees having a certain range of salary, as described above.

In order to generate the report, a database user has to be familiar with the commands and syntax of the query language used by a given database. This can require special training and expertise to write queries to generate reports. The user, interested in creating a report, is side-tracked first into learning this special language to find the data for the report. For example, there is a need to know the logic used by the query language, which can be counter-intuitive. If a user were to try to determine all employees who live in Oklahoma and Kentucky, the user would intuitively want to generate a query command asking for users in "Oklahoma and Kentucky." However, there is a difference between the 'and' as used in common English language and the logical AND operator used in query languages. In order to determine all employees who live in two different states, a logical OR has to be used to identify those employees that are residents of the first state or the second state. The AND operator would be used when trying to identify employees that are residents of both Oklahoma and Kentucky.

When working on a report layout and desired content, the database user often needs to make modifications to the report after reviewing the generated report. However, in most query languages, a simple modification to a report content or layout can require completely rewriting a new query statement. This query statement has to be run against the entire database to produce the updated report to be reviewed. This requires a lot of time from the user and from the computer system in which the database system is stored and the RDBMS is run. It would be better to be able to allow the database user to directly manipulate the report and immediately see the results of the alterations.

There are a number of query interfaces that simplify the query generation process, such as Query-By-Example (QBE) as described by M. M. Zloof, "Query-by-Example: a data base language", IBM System Journal, Vol 16, No. 4, 1977, pp. 324 ff. There are query building interfaces which simplify query writing by taking advantage of workstation based graphical user interfaces. While the current graphical interfaces make it easier to formulate queries, there is still a need for making the process even easier. Also, there is a need to improve the process of generating reports by allowing a user to formulate a query and design the report format at the same time. Particularly since people who work in a business environment are familiar with reports and since the goal in querying a database is to produce a report, it would be desirable to provide a graphical query interface which allows for direct manipulation of a report and for immediate feedback of how the database report format would appear.

SUMMARY OF THE INVENTION

A method is provided for interactively formulating a query and a report format simultaneously using data contained in the database stored in a computer system having a processor, memory, data storage and a display terminal. A table metaphor is displayed on the display terminal where the table metaphor corresponds to a subset of the database data. Alterations to the table metaphor made directly by a user are registered by the computer. An updated version of the table metaphor reflecting the direct alterations is displayed on the display terminal. Further alterations are registered and updated table metaphors are displayed a plurality of times until a final table metaphor is produced. A final query is produced reflecting the final table metaphor. The final query is run against the entire database to produce query output that is formatted according to the table metaphor.

One of the alterations can be a change to the report format, such as movement of the columns of the report. One way of indicating the movement of the columns is for the user to graphically move the columns using a mouse or other interactive device to click the mouse button after the mouse has been used to position the display screen cursor on a column, have the column become highlighted, then drag the highlighted column to a new location and then unclick the depressed mouse button.

Another registered alteration can be the generation of a new column based on other columns of the table. One way to generate a new column is to allow a user to place an operator between two adjacent columns. The new column generated contains respective attributes of the adjacent columns combined by the operator.

Other alterations of the table metaphor are placement of range limitations on attribute values for the report output and the combination of these attribute range limitations using AND and OR operations. One method of placing range limitations is to allow a user to indicate a cell of the table metaphor, display a select row, and then input a range limitation value and operator in the select row in the cell parallel to the selected cell. Entering more than one value and operator on the same select line has the effect of an AND operation requiring the query response have attribute values within both respective ranges. If the user selects another cell in the table metaphor, another select row is displayed. A plurality of select rows have the effect of an OR operation, where records (table metaphor rows) that satisfy the query satisfy all the respective range conditions of any select row. The table metaphor rows satisfying the query are highlighted for the user to identify which rows are part of the final output.

BRIEF DESCRIPTION OF THE DRAWINGS

FIG. 2 is an example of a table metaphor; and

FIGS. 3–8 illustrate alterations of the table metaphor of FIG. 2.

DETAILED DESCRIPTION OF THE INVENTION

Figure 1:
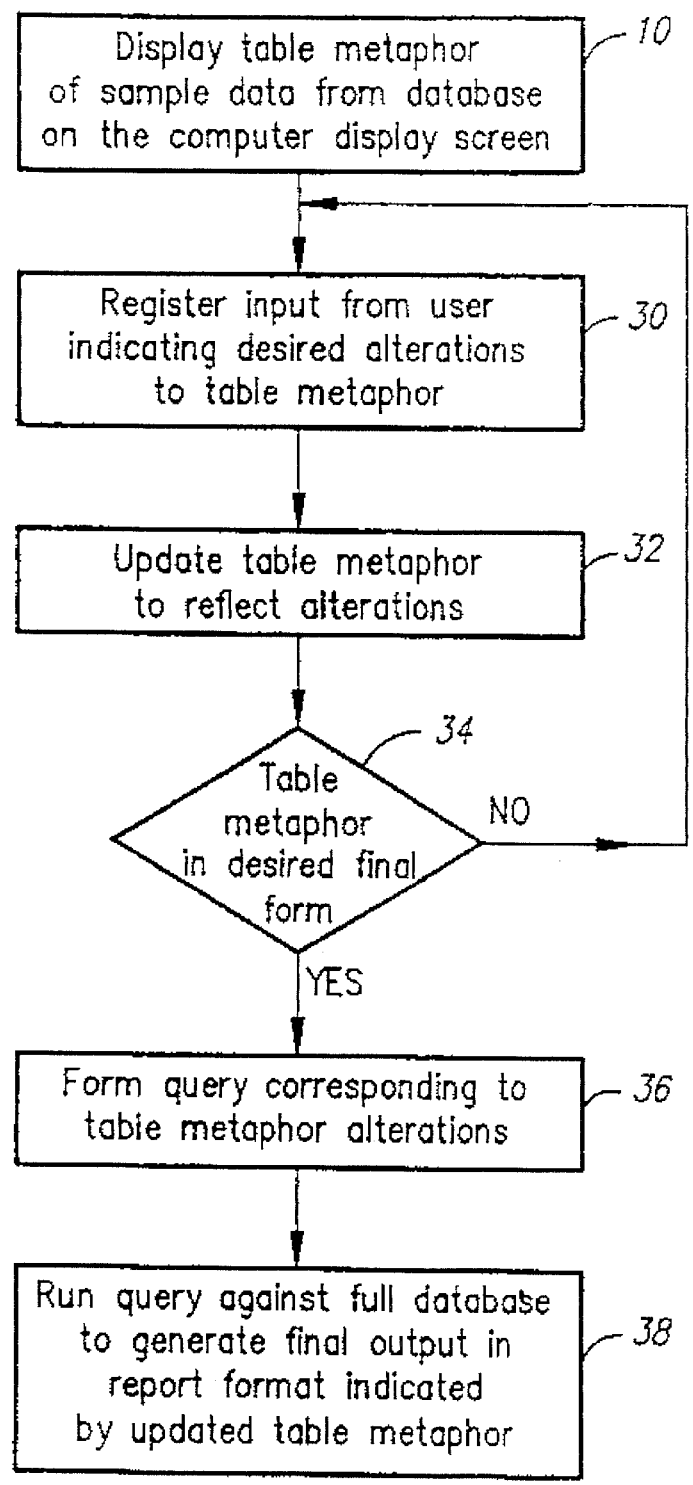
FIG. 1 is a flowchart of the preferred embodiment of the invention.
Figures 2, 3:
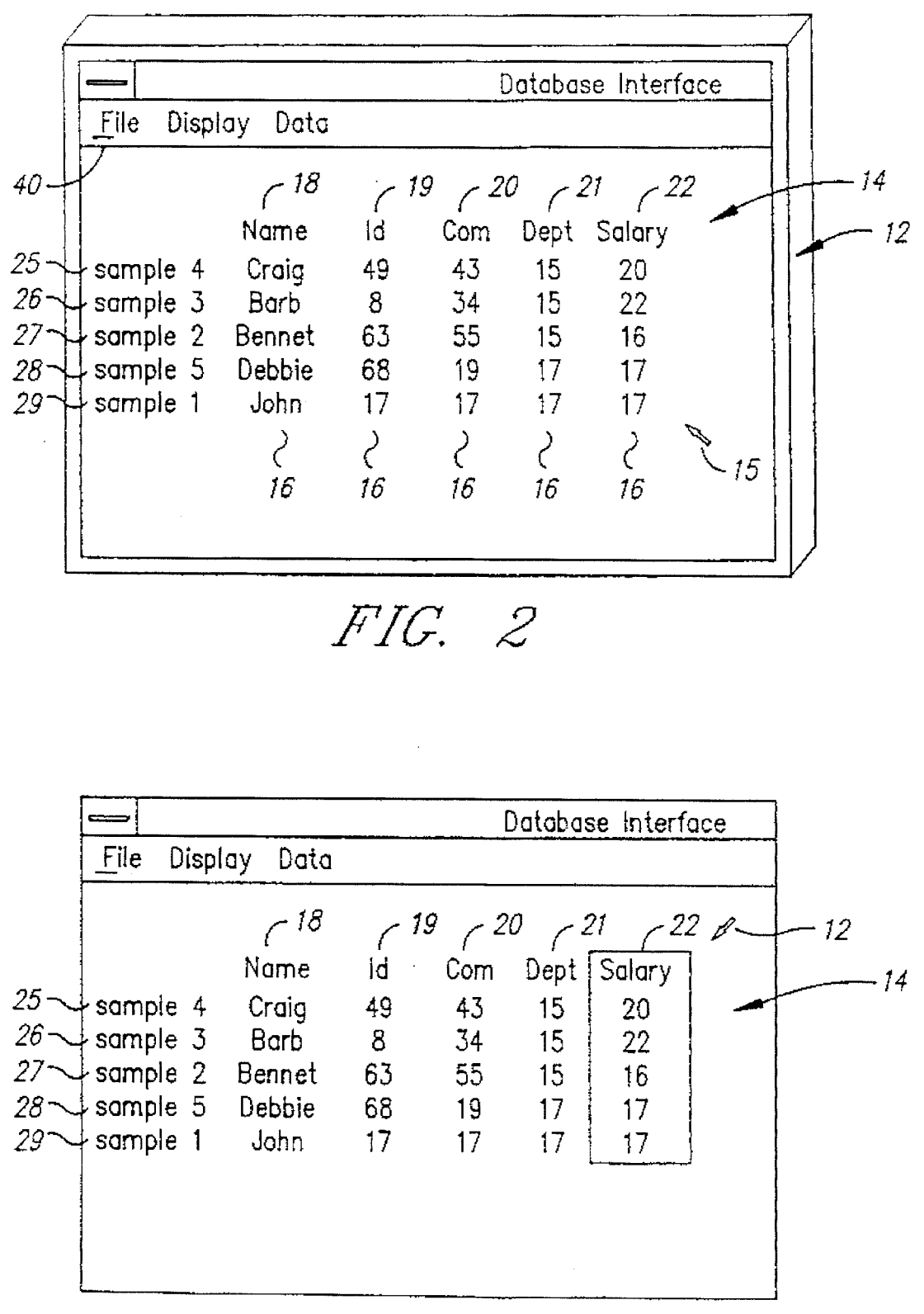

Referring to FIG. 1, the preferred embodiment of the invention provides for displaying a table metaphor on a display screen 10, such as table 14 on display screen 12 shown in FIG. 2 of sample data from a database. The database is stored in a computer system having memory, a processor, a display screen, external storage such as a disk drive, and interaction means, such as a mouse and keyboard, for enabling a user to interact with the system. The interaction means can comprise positioning means for a user to position a cursor 15 on the display screen and execution means for the user to signal the system. An example of positioning means and execution means is a mouse, having means for allowing a user to interactively control the position of the display screen cursor 15, and an associated button which can be depressed to signal the system. There are other such devices known to those skilled in the art for interacting with a computer system which can be used with this invention.

The database from which the table metaphor 14 shown in FIG. 2 is a subset contains information on employees. The table metaphor 14 has columns 16 containing attribute values for the employee name (Name) 18, the employee ID (Id) 19, the commission earned by the employee (Com) 20, the department (Dept) 21 of the employee, and the salary (Salary) 22 of the employee. The table metaphor 14 contains sample data rows 25–29 corresponding to five of the employees from the full database. The sample data used in the table metaphor is reflective of the range of attribute values in the database. The table metaphor can be a table of the database or preprocessing can be performed to provide a table that is some combination of database tables.

The table metaphor 14 is used as a worksheet to determine the final format of the report, such as which attributes would be included and the range of the attributes corresponding to the data to be retrieved. Referring again to FIG. 1, input from the user is registered by the system 30. The input indicates to the system the user's desired alterations to the table metaphor 14. The system processes the input and generates an updated table metaphor reflecting the alterations made by the user 32. The system can also generate the query statements used to generate the output as indicated by the user's alteration. These can be displayed to the user as a tutorial or as further explanation for the alterations entered by the user.

The user can continue to alter and update the table metaphor and have displayed on the display screen 12 the results of the alterations, until the user is satisfied with the results of table format and content 34. The system then generates a query statement corresponding to the final table metaphor 36. This query can be run against the entire database to generate a final output in the desired report format 38.

The foregoing procedure allows a user to generate queries without requiring knowledge of query languages. The queries can be constructed and refined iteratively before executing the query on the entire database. The iterative construction using sample data reduces the load on a shared centralized database system. Additionally, reports are formatted at the same time that the queries are constructed, thus eliminating a step in the normal process of producing reports.

There are various alteration that a user can input to indicate the format and contents of the final report. One of the alterations that can be input can relate to changing the placement of the columns of the report, deleting columns, or creating new columns by performing an operation on attribute values of existing columns. Other alterations of the table metaphor that can be input can relate to placing range limitations on attribute values for the report output and to combine these attribute range limitations using AND and OR operations.

The alterations are conveyed to the system using interactive graphic devices such as a computer mouse or keyboard. The user controls the placement of the cursor 15 and signals the system. The location of the cursor in relation to the table metaphor when the system is signalled indicates to the system the further prompts to be provided in order to register further input from the user. The user also interacts with the system using menu 40 sequences prompting input.

FIGS. 3–8 illustrate some examples of the direct alterations to the table metaphor 14. Referring to FIGS. 3 and 4, one alteration of the table metaphor can pertain to rearranging columns in the final report. For example, the user may want to move the salary column 22 closer to the commission column 20 so that it is easier to read the final report. In most database systems, the query language would provide a formatting statement to indicate how the report should appear. However, it is more productive to allow the user to see the results of rearranging columns, while still formatting and constructing the report.

In a preferred embodiment of the invention, an interactive device, such as a mouse, is used to move the cursor 15 over to the salary column 22. The user signals the system by clicking at that location (depressing the mouse button). The salary column 22 then becomes highlighted as shown in FIG. 3. While the user is depressing the mouse button, the salary column is dragged to a new location. When the salary column is at the desired location, the mouse button is released and the salary column 22 is positioned in its new location as shown in FIG. 4. There are numerous other ways of moving the columns as are well-known to those skilled in the art. A column can also be removed by indicating that a column is to be deleted using any one of a number of methods known to those skilled in the art.

Another alteration that can be input by the user pertains to adding a new column based on existing columns. Referring to FIG. 5, a new column 42 of salary plus commission has been added next to the commission column 20. The attribute values in the new column 42 are the respective salary and commission attribute values of the respective employees in rows 25–29.

A preferred method of generating the new column 40 is to allow the user to place an operator such as a plus sign ("+") 44 between the salary and commission columns, as shown in FIG. 4. The system responds to the operator input in the location between two columns and generates the new column 42 of the salary column added to the commission column. The results are displayed to the user in the updated table of FIG. 5 having the new column 42. The user can immediately see the results of the operation for the sample data and know how the final output report will appear having the new column 42.

Further alterations which can be input by the user pertain to providing a range limitation on attributes, so as to identify those records having attributes in the specified range value. Referring to FIG. 6, a range limitation for the salary attribute 22 of being less than $20,000 ("20 <") 50 has been input by the user (the table metaphor in FIGS. 3–8 has salary and commission values denoting thousands of dollars; so, for example, "20" denotes $20,000). Rows 27, 28 and 29 have been highlighted since these rows have salary attributes 51–53 within the specified range 50. In most database systems, a user wanting to query the database to find out for employees having a salary less than $20,000, the employees' names, IDs, salary amount, compensation commissions, total salary and commissions compensation, and department, have to write a query statement in the syntax of the database management system. Then, the output from the query has to be formatted for the report, also using the proper syntax of the query language. The user may run the query and view the report only to determine that there are no employees satisfying the specified condition. In this system, the user can identify what type of range values to specify based on the sample data attribute values. Therefore, this system makes it easier to compose reports with the relevant data which otherwise would have to be specified by using a query language.

In a preferred embodiment of the invention, in order to find all the employees whose salaries are less than $20,000, for example, the user first selects an individual salary by clicking on the cell containing that salary value using a mouse or other interactive device. Next, the user types an operator such as a "<" sign in the selected column. A select row 56 is added to the table metaphor to indicate the logical condition 50 the user has specified. The system using methods well-known to those skilled in the art determines which of the sample rows 25–29 have salary attribute values 22 meeting the specified condition 50. Each of the rows which fits into the sample data range as indicated in the select row 56 are highlighted (51–53 in FIG. 6).

Further conditions can be included as criteria for selecting rows that will be output in the final report, that is conditions for the query. Referring to FIG. 7, the logical OR operator can be used in a condition input by the user. The addition of an OR operation can result from the user viewing the results of a previous condition. For example, after viewing the updated table metaphor in FIG. 6, the user may wish to also include information on employees who have less than $40,000 in commissions, in addition to the employees that have less than $20,000 in salary.

The new condition can be added by the user by positioning the cursor in a cell of the commission column 20 of the table metaphor and signalling the system. The system then adds a new select row 60. The user then adds the condition of "<40" 62 in the commission attribute cell of the new select row 60.

The rows 26, 27, 28, and 29 that have respective attributes that fall within the range of the conditions specified in either of the select rows 56,60 are highlighted as shown in FIG. 6. The highlighted rows correspond to employees that either have salaries less than $20,000 or commission compensations less than $40,000. In this way, a user is able to form a query involving an OR operation without having to know the syntax or logic of a formal query language.

The user also formulates queries involving an AND operation (adding a further condition to be satisfied), using the the select rows 56, 60. The user can move the cursor 15 to a select line and type in the condition in the cell corresponding to the attribute to have the additional condition.

Referring to FIG. 8, the user inputs alterations to the table metaphor corresponding to identifying employees (and attributes regarding the employees) that have a salary of less than $20,000 and have total compensation (salary+commission) of less than $50,000 and also identifying employees having commission compensation less than $40,000 and total compensation less than $50,000.

The foregoing is accomplished by the user typing the value of 50 and the 'less than' operator ('<') into the salary+commission cells 68 of the select rows 56,60. The select rows 56,60 shown in FIG. 8 are logically equivalent to ((commission less than 40) and (salary plus commission less than 50)) or ((salary less than 20) and (salary plus commission) less than 50).

Using this system, the user can decide based on the highlighted sample data in FIG. 7 that the desired report should also contain output on individuals whose salary is less than $20,000 or whose commission is less than $40,000, provided that the total compensation is less than $50,000. If a query language statement had to be generated, the user would have to figure out how to generate the appropriate query using ANDs and ORs.

As illustrated in the foregoing examples, complex queries can be interactively formulated using the table metaphor to incrementally add more query conditions. More complex queries can be built using this method as would be known to those skilled in the art.

There are many improvements of using the invention. The query requires fewer terms than a query in SQL. The context of the interface supplies much of the information that users have to type in using other query methods. For example, by clicking directly on a column, the user is specifying that the next condition entered will apply to that column. It is also easier for users to understand what the query will do. For example, having the sample data highlighted which matches the query allows users to check and refine the query before sending it off to the database. The users thus have a more accurate understanding of the query before it is issued. The user also interacts naturally with the database using the metaphor tables. There is also no need to remember commands or syntax for moving or combining columns. The sample data also helps the user to refine the data more accurately and to include or exclude conditions from the query that might not otherwise be as easily incorporated.

While the invention has been particularly shown and described with reference to a preferred embodiment thereof, it will be understood by those skilled in the art that various other changes in the form and details may be made therein without departing from the spirit and scope of the invention. Accordingly, the method and system herein disclosed are to be considered merely as illustrative and the invention is to be limited only as specified in the claims.

We claim:

1. In a computer system having a processor, memory, a data storage device, a display screen, interaction means for enabling a user to interact with the system, and a database of data stored in the data storage device, a method for formulating a report comprising the steps of:

(a) displaying on the display screen a table metaphor having rows and columns of attribute value cells, the attribute value cells containing attribute values reflective of a subset of attribute values of the database data;

(b) registering, through interaction means, direct alterations to the table metaphor;

(c) displaying on the display screen a revised table metaphor graphically representing a revised report format reflecting the registered direct alterations;

(d) determining a query statement corresponding to the revised table metaphor; and (e) running the query statement on the database to produce query output in the revised report format.

2. An apparatus for formulating a report using data contained in a database stored in a storage device connected to a computer system having a processor, memory and a display terminal, said apparatus comprising:

means for providing a subset of the database data in a displayed metaphor table;

means for registering at least one direct alteration to the metaphor table to graphically represent a report format;

means for determining a query corresponding to the report format; and means for running the query on the database data to produce the report in the report format.

* * * * *